(12) United States Patent
Igarashi et al.

(10) Patent No.: US 9,229,573 B2
(45) Date of Patent: Jan. 5, 2016

(54) INPUT DEVICE, INPUT SUPPORT METHOD, AND PROGRAM

(71) Applicant: PANASONIC CORPORATION, Osaka (JP)

(72) Inventors: Tatsuro Igarashi, Kanagawa (JP); Noboru Obana, Osaka (JP); Shumpei Zouda, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/235,143

(22) PCT Filed: Apr. 11, 2013

(86) PCT No.: PCT/JP2013/002485
§ 371 (c)(1),
(2) Date: Jan. 27, 2014

(87) PCT Pub. No.: WO2013/183208
PCT Pub. Date: Dec. 12, 2013

(65) Prior Publication Data
US 2014/0184551 A1    Jul. 3, 2014

(30) Foreign Application Priority Data
Jun. 6, 2012    (JP) ................. 2012-129228

(51) Int. Cl.
*G06F 3/041*    (2006.01)
*G06F 3/044*    (2006.01)
(Continued)

(52) U.S. Cl.
CPC .............. *G06F 3/0416* (2013.01); *G06F 3/039* (2013.01); *G06F 3/041* (2013.01); *G06F 3/044* (2013.01); *G06F 3/0418* (2013.01); *G06F 3/0488* (2013.01); *G06F 2203/04101* (2013.01)

(58) Field of Classification Search
CPC ....... G06F 3/041; G06F 3/0416; G06F 3/044; G06F 3/0487; G06F 2203/04105; G06F 3/0414
See application file for complete search history.

(56) References Cited

U.S. PATENT DOCUMENTS

2008/0305836 A1* 12/2008 Kim et al. ............. 455/564
2009/0219175 A1   9/2009 Takashima et al.
(Continued)

FOREIGN PATENT DOCUMENTS

| JP | 10-091226 | 4/1998 |
|---|---|---|
| JP | 2008-033701 | 2/2008 |

(Continued)

OTHER PUBLICATIONS

Japanese Patent Publication: 2011-130288 by Shima.*
(Continued)

*Primary Examiner* — Adam R Giesy
(74) *Attorney, Agent, or Firm* — Greenblum & Bernstein, P.L.C.

(57) ABSTRACT

An input device includes a touch panel which detects proximity or contact of a detection target, a coordinates extraction unit which extracts coordinates information including at least a z coordinate, in a direction perpendicular to a surface of the touch panel, of the proximity or contact-detected detection target, and a control unit which determines a contact threshold value for detection of contact of the detection target to the touch panel on the basis of coordinates information of the detection target extracted with an initial manipulation on the surface of the touch panel.

8 Claims, 11 Drawing Sheets

(51) Int. Cl.
*G06F 3/0488* (2013.01)
*G06F 3/039* (2013.01)

(56) References Cited

U.S. PATENT DOCUMENTS

| | | | |
|---|---|---|---|
| 2009/0237372 A1* | 9/2009 | Kim et al. | 345/173 |
| 2009/0289914 A1* | 11/2009 | Cho | 345/173 |
| 2010/0060609 A1* | 3/2010 | Doi et al. | 345/174 |
| 2010/0214258 A1* | 8/2010 | Kuan | 345/174 |
| 2010/0302205 A1 | 12/2010 | Noma | |
| 2012/0154307 A1* | 6/2012 | Nunomaki | 345/173 |
| 2014/0028557 A1 | 1/2014 | Otake et al. | |
| 2014/0111430 A1* | 4/2014 | Shima | 345/157 |

FOREIGN PATENT DOCUMENTS

| | | |
|---|---|---|
| JP | 2009-181232 | 8/2009 |
| JP | 2009-212719 | 9/2009 |
| JP | 2011-198004 | 10/2011 |
| JP | 2012-103995 | 5/2012 |
| WO | 2012/169106 | 12/2012 |
| WO | 2013/021858 | 2/2013 |

OTHER PUBLICATIONS

International Search Report and Written Opinion in PCT/JP2013/002485, mail date is Jul. 16, 2013, together with English translation of ISR.
U.S. Appl. No. 14/164,458 to Tomoki Takano et al., which was filed on Jan. 27, 2014.
U.S. Appl. No. 14/236,097 to Masatoshi Nakao, which was filed on Jan. 30, 2014.
U.S. Appl. No. 14/236,106 to Hideyuki Yoshino et al., which was filed on Jan. 30, 2014.
U.S. Appl. No. 14/164,521 to Tomoki Takano et al., which was filed on Jan. 27, 2014.
U.S. Appl. No. 14/164,497 to Takeshi Yamaguchi et al., which was filed on Jan. 27, 2014.
U.S. Appl. No. 14/235,878 to Mitsuru Satou, which was filed on Jan. 29, 2014.

* cited by examiner

FIG. 3
(A)
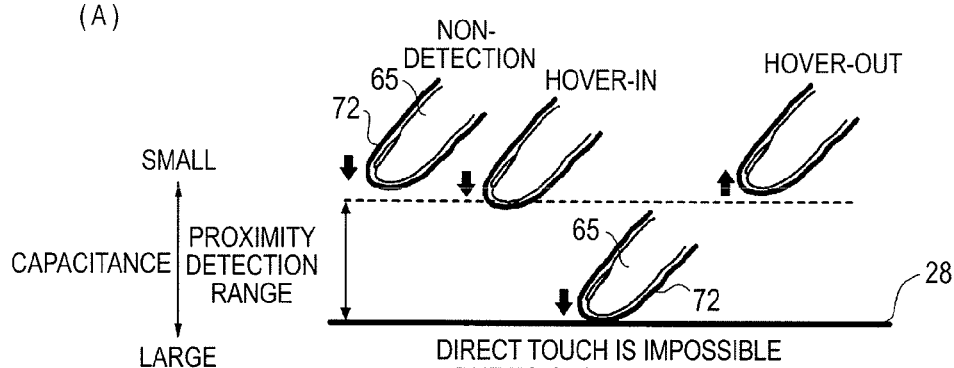
(B)
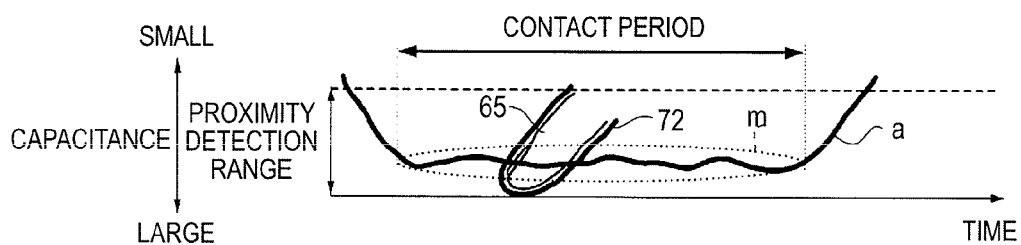
(C)
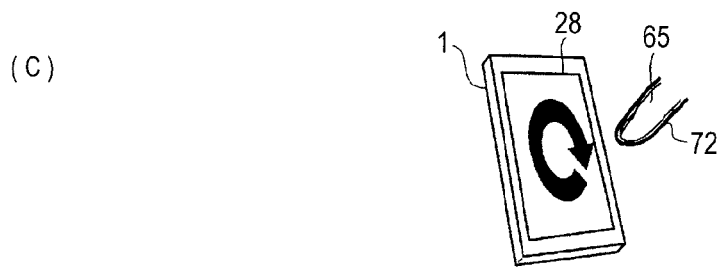
(D)
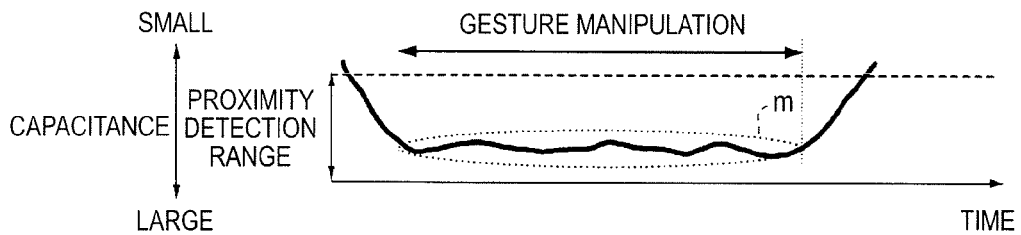

FIG. 4
(A)
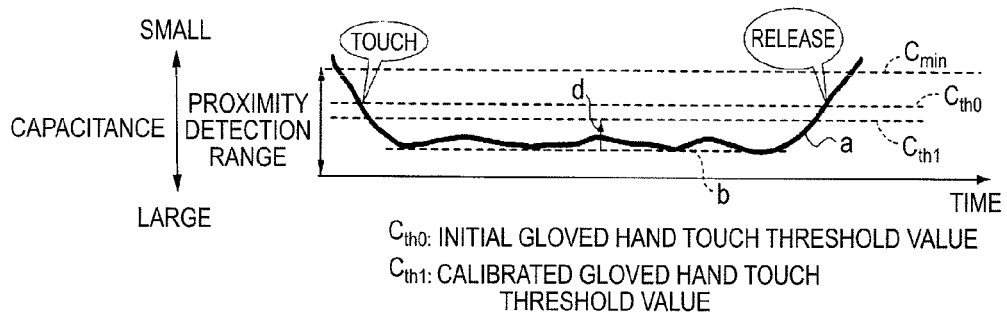
$C_{th0}$: INITIAL GLOVED HAND TOUCH THRESHOLD VALUE
$C_{th1}$: CALIBRATED GLOVED HAND TOUCH THRESHOLD VALUE
(B)
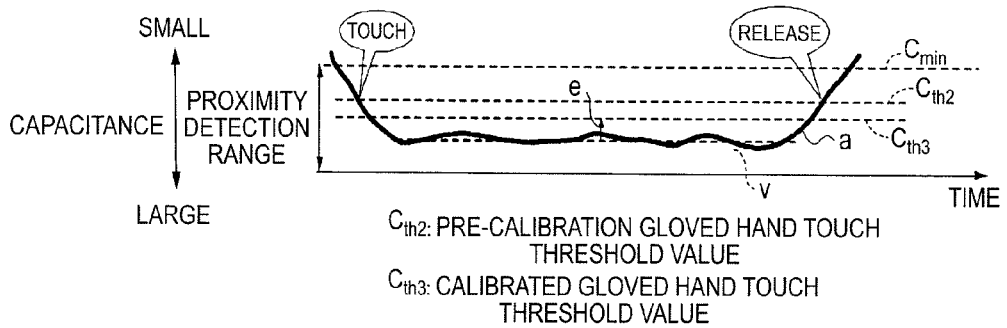
$C_{th2}$: PRE-CALIBRATION GLOVED HAND TOUCH THRESHOLD VALUE
$C_{th3}$: CALIBRATED GLOVED HAND TOUCH THRESHOLD VALUE
(C)
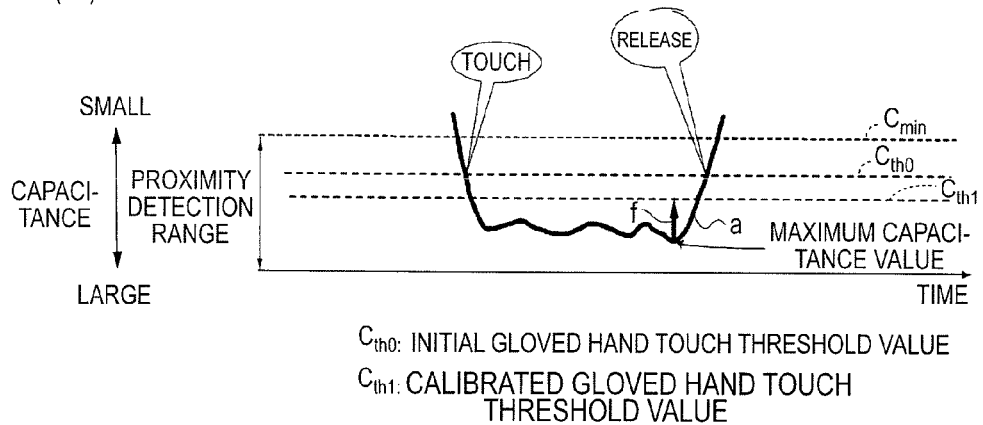
$C_{th0}$: INITIAL GLOVED HAND TOUCH THRESHOLD VALUE
$C_{th1}$: CALIBRATED GLOVED HAND TOUCH THRESHOLD VALUE

INPUT DEVICE, INPUT SUPPORT METHOD, AND PROGRAM

TECHNICAL FIELD

The present invention relates to an input device, an input support method, and a program for receiving input manipulations through a touch panel.

BACKGROUND ART

In recent years, electronic apparatus incorporating a touch panel have come into wide use. And touch panels which allow users to make intuitive manipulations have come to be used widely as devices for receiving input manipulations on electronic apparatus including cellphones. Touch panels enable, through the same screen of a display unit (e.g., LCD (liquid crystal display) or organic EL (electroluminescence) display) provided in an electronic apparatus, reception of an input manipulation on the screen and display processing for a processing result of the electronic apparatus.

On the other hand, touch panels capable of detecting coming into proximity of an indication medium (e.g., finger) have appeared. In touch panels of this kind, signals detected in accordance with a finger movement in a space that is spaced from the surface of the touch panel and is in a prescribed height range can be used like signals produced as a result of a slide manipulation that a finger is moved across the surface of a touch panel being kept in direct contact with it. As such, touch panels of this kind are expected to become a new user interface.

Users make manipulations on touch panels in two kinds of manners: a direct manipulation with a finger of a bare hand and a manipulation with a finger of a gloved hand (e.g., the glove is made of a transparent or semitransparent resin). It is necessary to set touch threshold values for both cases, that is, the case of manipulations with a bare hand (hereinafter referred to simply as "bare hand manipulations") and the case of manipulations with a gloved hand (hereinafter referred to simply as "gloved hand manipulations"). For example, in the case of capacitance touch panels, the touch threshold value is represented by a capacitance value. And it is judged that a touch manipulation has been made if a capacitance value that is larger than the touch threshold value is detected.

The touch switch disclosed in Patent document 1 is known as a prior art technique relating to the touch threshold value for bare hand manipulations and the touch threshold value for gloved hand manipulations. In this touch switch, a touch threshold value for bare hand manipulations and a touch threshold value for gloved hand manipulations are held in advance. And it is judged tentatively that a touch has been made if the touch threshold value for gloved hand manipulations is exceeded for a prescribed time or longer even if the touch threshold value for bare hand manipulations is not exceeded. Furthermore, in the touch switch, when it is judged tentatively that a touch has been made, the tentative touch is judged a true touch unless a bare hand touch is detected at another position on the touch panel.

PRIOR ART DOCUMENTS

Patent Documents

Patent document 1: JP-A-2009-181232

SUMMARY OF THE INVENTION

Problems to be Solved by the Invention

However, in the touch switch of Patent document 1, it is necessary to judge whether the input manipulation is a gloved hand manipulation or a bare hand manipulation every time the user makes an input manipulation of the touch panel. This complicates the operation of the touch switch, as a result of which individual resources incorporated in the touch switch need to bear heavy loads.

Furthermore, in the touch switch of Patent document 1, if a finger of a bare hand is placed for a prescribed time or longer at a position that is slightly spaced from the surface of the touch panel, it is judged a touch of a gloved hand manipulation and the touch threshold value for gloved manipulations is set. That is, it is judged that a touch has been made though no direct touch has been made. This may cause acceptance of an erroneous manipulation that does not conform to an intention of the user.

The present invention has been made in the above circumstance of the prior art, and an object of the present invention is therefore to provide an input device, an input support method, and a program which switch to a gloved hand manipulation mode or a bare hand manipulation mode in a simple manner in accordance with an input manipulation on a touch panel without the need for performing a complicated operation.

Means for Solving the Problems

An input device according to one embodiment of the invention comprises a touch panel which detects proximity or contact of a detection target; a coordinates extraction unit which extracts coordinates information including at least a z coordinate, in a direction perpendicular to a surface of the touch panel, of the proximity or contact-detected detection target; and a control unit which determines a contact threshold value for detection of contact of the detection target to the touch panel on the basis of coordinates information of the detection target extracted with an initial manipulation on the surface of the touch panel.

This configuration makes it possible to switch to a gloved hand manipulation mode or a bare hand manipulation mode in a simple manner in accordance with an input manipulation on the touch panel without the need for performing a complicated operation.

An input support method according to the one embodiment of the invention is an input support method of an input device having a touch panel for detecting proximity or contact of a detection target, comprises the steps of extracting coordinates information including at least a z coordinate, in a direction perpendicular to a surface of the touch panel, of the proximity or contact-detected detection target; and determining a contact threshold value for detection of contact of the detection target to the touch panel on the basis of coordinates information of the detection target extracted with an initial manipulation on the surface of the touch panel.

This method makes it possible to switch to the gloved hand manipulation mode or the bare hand manipulation mode in a simple manner in accordance with an input manipulation on the touch panel without the need for performing a complicated operation.

A program according to the one embodiment of the invention is a program for causing a computer which is an input device having a touch panel for detecting proximity or contact of a detection target, to execute the steps of extracting coordinates information including at least a z coordinate, in a direction perpendicular to a surface of the touch panel, of the proximity or contact-detected detection target; and determining a contact threshold value for detection of contact of the detection target to the touch panel on the basis of coordinates information of the detection target extracted with an initial manipulation on the surface of the touch panel.

This program makes it possible to switch to the gloved hand manipulation mode or the bare hand manipulation mode in a simple manner in accordance with an input manipulation on the touch panel without the need for performing a complicated operation.

Advantages of the Invention

The invention makes it possible to switch to the gloved hand manipulation mode or the bare hand manipulation mode in a simple manner in accordance with an input manipulation on a touch panel without the need for performing a complicated operation.

BRIEF DESCRIPTION OF THE DRAWINGS

FIG. 3(A) illustrates problems of a touch manipulation performed in the gloved hand manipulation mode, FIG. 3(B) shows a capacitance waveform that is produced during a touch manipulation or a touch slide manipulation in the gloved hand manipulation mode, FIG. 3(C) illustrates an example gloved hand manipulation, and FIG. 3(D) shows a capacitance waveform that is detected during the gloved hand manipulation shown in FIG. 3(C).

FIGS. 4(A)-4(C) illustrate a method for calibrating a gloved hand touch threshold value.

MODE FOR CARRYING OUT THE INVENTION

Figure 1:
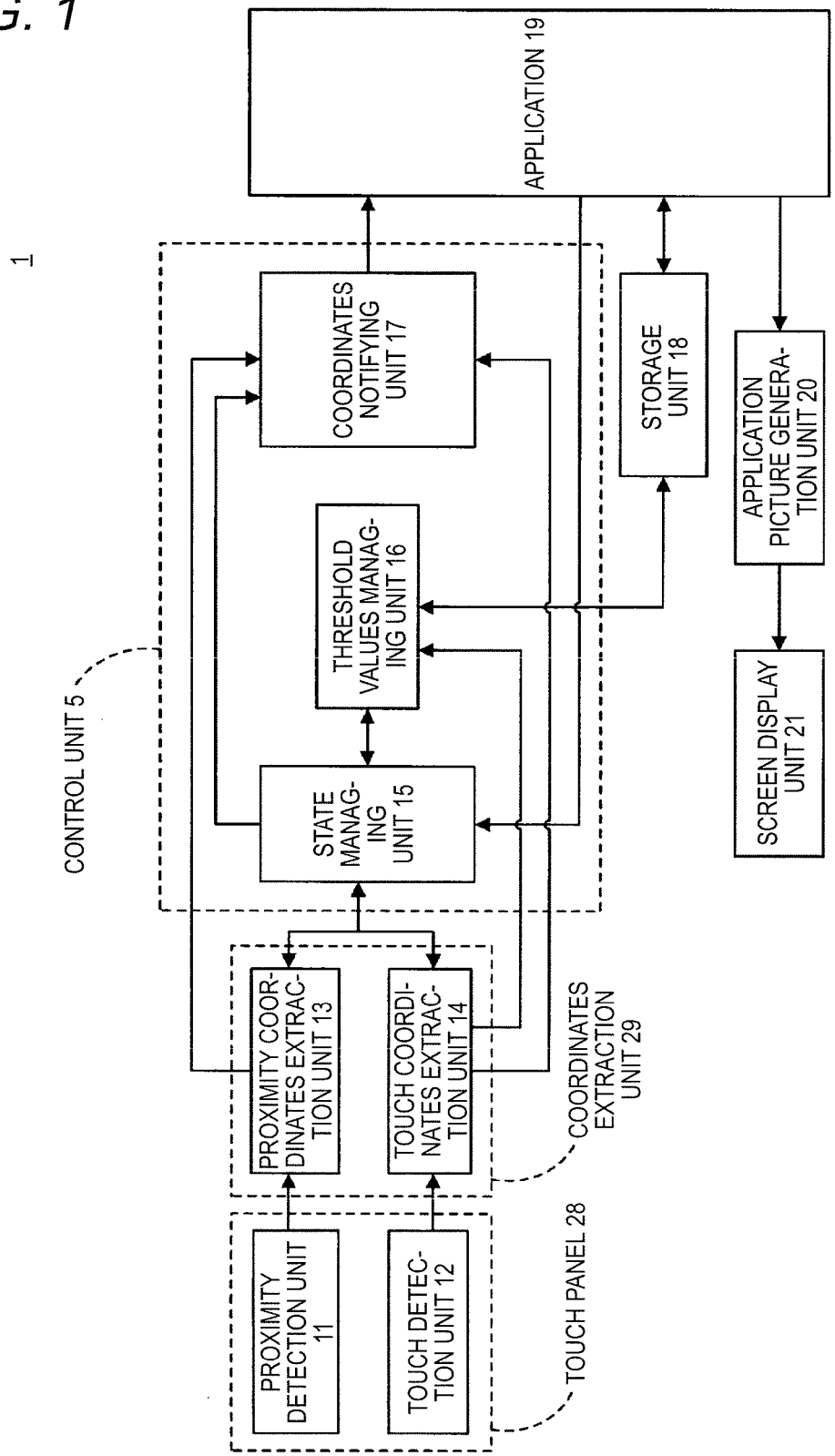
FIG. 1 is a block diagram showing the functional configuration of a portable terminal 1 according to a first embodiment.

Input device according to embodiments, among the input device, input support methods, and programs, of the present invention will be hereinafter described with reference to the drawings. Input device to which the embodiments are applicable encompass electronic apparatus incorporating a display unit having a function of displaying data on the display screen and having a touch panel formed on the display unit, such as a cellphone, a smartphone, a tablet terminal, a digital still camera, a PDA (personal digital assistant), and an e-book terminal. The following embodiments will be directed to portable terminals (e.g., smartphones) as example input device.

The invention can be expressed as an input device as an apparatus or a program for causing an input device to operate as a computer. Furthermore, the invention can also be expressed as an input support method including individual operations (steps) performed by an input device. That is, the invention can be expressed in any of the categories of an apparatus, a method, and a program.

In the following description, the two axes that represent the horizontal surface (manipulation surface) of a touch panel are called x and y axes, and the axis that is vertical to the touch panel (i.e., the axis in the height direction) is called a z axis. Furthermore, in the following description, it is assumed that the term "coordinates" includes both of touch coordinates (x, y) which are a combination of x and y coordinates and represent a position on the horizontal surface of the touch panel and coordinates (x, y, z) which are a combination of the above touch coordinates (x, y) and a distance between the touch panel surface and a detection target (e.g., finger) in the z-axis direction (i.e., a height of the detection target in the vertical direction).

Although the following description will be made using a finger of a user (person) as an example detection target for the touch panel, the detection target is not limited to a finger and may be a conductive stylus gripped by a user hand. No particular limitations are imposed on the detection target as long as coming into proximity and a touch to the touch panel can be detected in accordance with the touch panel structure and detection method (e.g., capacitance type, electromagnetic induction type, or pressure-sensing type).

Furthermore, in the following description, a "hover manipulation" is defined as a manipulation of placing a finger at a spatial position that is spaced from the surface of the touch panel and a "hover slide manipulation" is defined as a manipulation of sliding (moving) a finger from a spatial position of a hover manipulation approximately parallel with the touch panel surface. Therefore, a manipulation that a finger directly touches the surface of a touch panel is a "touch manipulation" rather than a hover manipulation. And a "touch slide manipulation" is defined as a manipulation that a finger is slid (moved, dragged) being kept in contact with the surface of the touch panel.

Still further, in the following description, a "release manipulation" is defined as a manipulation that the finger is released from the surface of the touch panel into the space upon completion of a touch manipulation or a touch slide manipulation. And a "tap manipulation" is defined as a manipulation of tapping the surface of the touch panel, that is, touching the surface of the touch panel with a finger and releases it from the touch panel surface immediately.

For a hover manipulation or a hover slide manipulation to be detected by a capacitance touch panel, it is preferable that the distance between a finger and the surface of the touch panel (i.e., the height of the finger) be in a distance range corresponding to a detectable capacitance range of the touch panel. This is because the distance is inversely proportional to the capacitance detected by the touch panel.

BACKGROUND OF THE INVENTION

Figure 2:
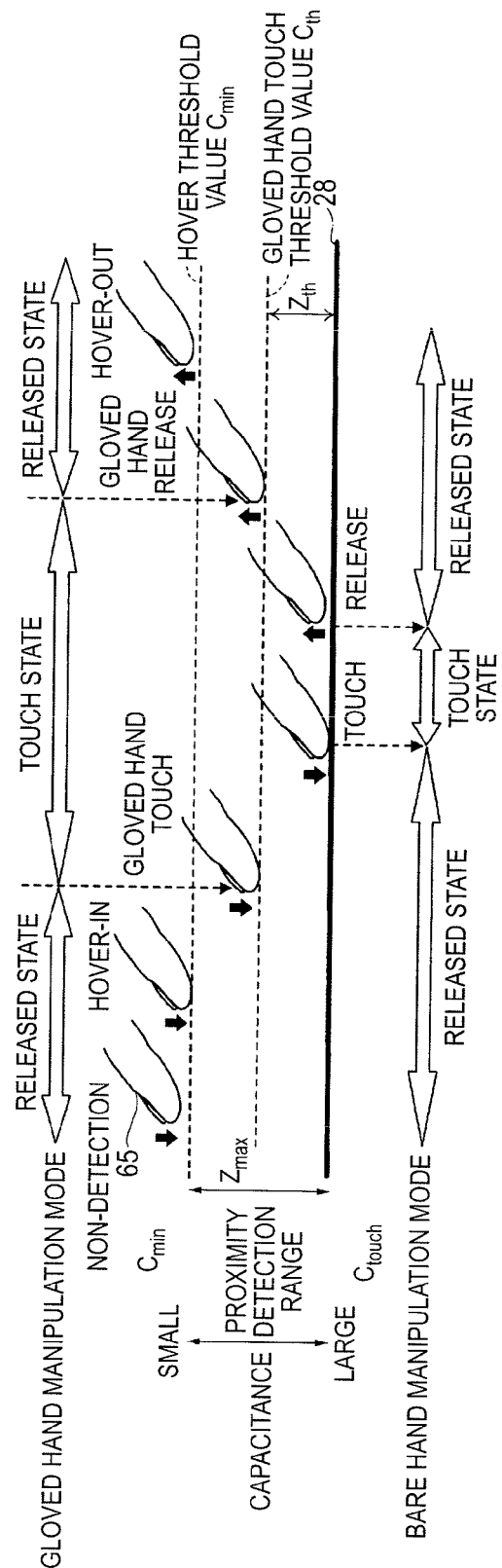
FIG. 2 illustrates a bare hand manipulation mode and a gloved hand manipulation mode.

To solve the problems of Patent document 1 that relate to a bare hand manipulation and a gloved hand manipulation of a user, the present inventors studied an input device which switches between a bare hand manipulation mode and a gloved hand manipulation mode in a simple manner. The bare hand manipulation mode and the gloved hand manipulation mode will now be described with reference to FIG. 2. FIG. 2 illustrates the bare hand manipulation mode and the gloved hand manipulation mode.

As described later in detail, a touch panel 28 (see FIG. 1) capable of detecting proximity or contact of a finger 65 is provided in a portable terminal according to each of embodiments to be described below. A proximity detection range (represented by a z coordinate $z_{max}$ or a capacitance value $C_{min}$) in which proximity of the finger 65 can be detected are set in advance for the touch panel 28. In the following description, the capacitance value $C_{min}$ will be referred to as a hover threshold value. If the finger 65 goes into the proximity detection range, the touch panel 28 produces a capacitance value that is larger than or equal to $C_{min}$ and hence coming into proximity of the finger 65 is detected. In the following, a capacitance value for detection of proximity of the finger 65 by the touch panel 28 will be referred to as $C_{min}$ and a capacitance value for detection of contact of the finger 65 by the touch panel 28 will be referred to as $C_{touch}$ irrespective of whether the bare hand manipulation mode or the gloved hand manipulation mode is established.

In the following description, "hovering-in" means a manipulation of moving the finger 65 from outside the proximity detection range to inside it to start detection of proximity of the finger 65. And "hovering-out" means a manipulation of moving the finger 65 from inside the proximity detection range to outside it to finish detection of proximity of the finger 65.

In the following description, the capacitance that is produced between the finger 65 and the touch panel 28 when the finger 65 goes into the proximity detection range or the z coordinate of the proximity coordinates (x, y, z) of the finger 65 will be used as a variable for detecting proximity or contact of the finger to the touch panel 28.

In the bare hand manipulation mode, a bare hand touch threshold value corresponding to it is set in advance. The bare hand touch threshold value is the capacitance value $C_{touch}$ that can be detected by the touch panel 28 in the case where it is represented by a capacitance value, and is equal to, for example, zero in the case where it is represented by a z coordinate value. Therefore, in the bare hand manipulation mode, a touch state lasts from a touch manipulation of the finger 65 on the touch panel 28 to a release manipulation of the finger 65. The finger 65 is in a released state when it is not in the touch state (see FIG. 2).

In the gloved hand manipulation mode, a gloved hand touch threshold value (indicated by a broken line in FIG. 2) corresponding to it is set in advance. The gloved hand touch threshold value is equal to a prescribed capacitance value $C_{th}$ which is smaller than the capacitance value $C_{touch}$ that can be detected by the touch panel 28 in the case where it is represented by a capacitance value, and is equal to a z coordinate value $z_{th}$ corresponding to the prescribed capacitance value $C_{th}$ in the case where it is represented by a z coordinate value. Therefore, in the gloved hand manipulation mode, the finger 65 is in a touch state from a time when the touch panel 28 comes to detect a capacitance value that is larger than or equal to the gloved hand touch threshold value $C_{th}$ to a time when the touch panel 28 comes to detect a capacitance value that is smaller than the gloved hand touch threshold value $C_{th}$. The finger 65 is in a released state when it is not in the touch state (see FIG. 2).

In each of the bare hand manipulation mode and the gloved hand manipulation mode, it is necessary that the corresponding touch threshold value be set properly. When switching between the manipulation modes has been made, it is necessary that the touch threshold value corresponding to the new operation mode be set. The following description will be made with an assumption that the touch threshold values are capacitance values.

For example, while a user is making bare hand manipulations with a bare hand, the bare hand touch threshold value which corresponds to the bare hand manipulation mode must be set. If the gloved hand touch threshold value were set, the touch panel 28 would detect the gloved hand touch threshold value before the bare hand touch threshold value. This may cause an event that the touch panel 28 detects a touch manipulation that does not conform to an intention of the user and an application of a portable terminal, for example, reacts to it, which means acceptance of an erroneous manipulation.

While a user is making gloved hand manipulations with a gloved hand, the gloved hand touch threshold value which corresponds to the gloved hand manipulation mode must be set. If the bare hand touch threshold value were set, the touch panel 28 could not detect the bare hand touch threshold value unless the user takes off the glove. Therefore, a portable terminal could not receive a touch manipulation of the user who is making gloved hand manipulations.

Furthermore, users wear a variety of gloves and the proper touch threshold value varies depending on the thickness and the material of the glove. It would be necessary to set a gloved hand touch threshold value that is suitable for each glove worn by a user.

The present inventors did research in view of the above issues and have invented a portable terminal which can switch its operation mode in a simple manner between the gloved hand manipulation mode and the bare hand manipulation and properly adjust the gloved hand touch threshold value in the gloved hand manipulation mode. Portable terminals according to respective embodiments will be described below.

Embodiment 1

FIG. 1 is a block diagram showing the functional configuration of a portable terminal 1 according to a first embodiment. The portable terminal 1 includes a proximity detection unit 11, a touch detection unit 12, a proximity coordinates extraction unit (or extractor) 13, a touch coordinates extraction unit (or extractor) 14, a control unit (or controller) 5, a storage unit 18, an application 19, an application picture generation unit 20, and a screen display unit 21. The proximity detection unit 11 and the touch detection unit 12 are formed by a touch panel 28 (see FIG. 2) which detects proximity and contact of a finger to the display screen of the screen display unit 21.

The proximity coordinates extraction unit 13 and the touch coordinates extraction unit 14 constitute a coordinates extraction unit (or extractor) 29 which calculates and extracts proximity coordinates (x, y, z) or touch coordinates (x, y) when the touch panel 28 has detected proximity or contact of a finger.

The control unit 5 includes a state managing unit 15, a threshold values managing unit 16, and a coordinates notifying unit 17. The individual units, that is, the state managing unit 15, the threshold values managing unit 16, and the coordinates notifying unit 17, of the control unit 5 is operation-enabled when a processor (not shown) incorporated in the portable terminal 1 runs programs according to the invention it has read out. For example, the processor is a CPU (central processing unit), an MPU (micro processing unit), or a DSP (digital signal processor).

The proximity detection unit 11 detects that a user finger 65 (e.g., index finger; this also applies to the following description) has come close to the touch panel 28 as a result of a hover manipulation or a hover slide manipulation. The proximity detection unit 11 outputs, to the proximity coordinates extraction unit 13, a proximity notice to the effect that the finger 65 has come close to the touch panel 28.

The touch detection unit 12 detects that a finger 65 has contacted the touch panel 28 as a result of a touch manipulation or a touch slide manipulation. The touch detection unit 12 outputs, to the touch coordinates extraction unit 14, a contact notice to the effect that the finger 65 has contacted the touch panel 28.

The proximity coordinates extraction unit 13 calculates and extracts proximity coordinates (x, y, z) of the proximity-detected finger 65 on or with respect to the touch panel 28 and a capacitance value as a particular parameter corresponding to the z coordinate of the proximity coordinates (x, y, z) every predetermined time (e.g., 15 ms) on the basis of the proximity notice that is output from the proximity detection unit 11. The x and y components of the proximity coordinates (x, y, z) are coordinate values representing a position on the surface of the touch panel 28, and their z component is a coordinate value representing a distance between the finger 65 and the touch panel 28 in the z-axis direction (i.e., a height of the finger). The proximity coordinates extraction unit 13 outputs the information of the extracted proximity coordinates (x, y, z) and the information of the extracted capacitance value to the state managing unit 15. Furthermore, the proximity coordinates extraction unit 13 outputs the information of the proximity coordinates (x, y, z) and the information of the capacitance value corresponding to the proximity coordinates (x, y, z) to the coordinates notifying unit 17 on the basis of an instruction from the state managing unit 15.

The touch coordinates extraction unit 14 calculates and extracts touch coordinates (x, y) representing a position where the contact-detected finger 65 has contacted the touch panel 28 and a capacitance value (particular parameter) corresponding to the touch coordinates (x, y) every predetermined time (e.g., 15 ms) on the basis of the contact notice that is output from the touch detection unit 12. The x and y components of the touch coordinates (x, y) are coordinate values representing a position on the surface of the touch panel 28. The touch coordinates extraction unit 14 outputs the information of the extracted touch coordinates (x, y) and the information of the extracted capacitance value to the state managing unit 15. Furthermore, the touch coordinates extraction unit 14 outputs the information of the touch coordinates (x, y) and the information of the capacitance value corresponding to the touch coordinates (x, y) to the coordinates notifying unit 17 on the basis of an instruction from the state managing unit 15.

The state managing unit 15 judges whether the operation mode of the portable terminal 1 should be the bare hand manipulation mode or the gloved hand manipulation mode on the basis of the information of the proximity coordinates (x, y, z) and the information of the capacitance value that are output from the proximity coordinates extraction unit 13 or the information of the touch coordinates (x, y) and the information of the capacitance value that are output from the touch coordinates extraction unit 14. The state managing unit 15 switches the operation mode of the portable terminal 1 to a judgment result operation mode, that is, the bare hand manipulation mode or the gloved hand manipulation mode. Operation mode information (e.g., bare hand flag (described later) of the portable terminal 1 is temporarily stored in the storage unit 18 or a RAM (random access memory; not shown) and referred to or rewritten by the state managing unit 15 when necessary. However, to avoid complicating the figure, an arrow between the state managing unit 15 and the storage unit 18 is omitted in FIG. 1.

The gloved hand manipulation mode is an operation mode of the portable terminal 1 which assumes a state that the user makes manipulations with a finger 65 that is covered with a glove 72. Since the finger 65 covered with the glove 72 cannot directly contact the surface of the touch panel 28 (see FIG. 3(A)), in the gloved hand manipulation mode the gloved hand touch threshold value $C_{th}$ for allowing the portable terminal 1 to receive a touch manipulation is set in advance.

As described above, in the gloved hand manipulation mode, it is judged that a touch manipulation has been made if a capacitance value detected by the touch panel 28 is larger than or equal to the gloved hand touch threshold value $C_{th}$. If a capacitance value detected by the touch panel 28 is smaller than the gloved hand touch threshold value $C_{th}$, it is judged that a touch manipulation has not been made.

On the other hand, the bare hand manipulation mode is an operation mode of the portable terminal 1 which assumes a state that the user makes manipulations with a finger 65 of a bare hand (i.e., a hand not covered with a glove 72). In the bare hand manipulation mode, it is judged that a touch manipulation has been made if contact of a finger 65 to the display screen of the screen display unit 21 is detected, that is, a capacitance value detected by the touch panel 28 is larger than or equal to $C_{touch}$. If a capacitance value detected by the touch panel 28 is smaller than $C_{touch}$, it is judged that a touch manipulation has not been made.

When receiving, from the application 19, an unlocking picture display notice to the effect that an unlocking picture has been displayed (activated), the state managing unit 15 switches the operation mode of the portable terminal 1 to an operation judging mode and outputs, to the threshold values managing unit 16, a switching notice to the effect that the operation mode of the portable terminal 1 has been switched to the operation judging mode. In the embodiments including this embodiment, a manipulation for canceling a lock state (suspension state) of the portable terminal 1 is an example initial manipulation to be made by the user on the portable terminal 1.

The state managing unit 15 outputs a calibration instruction to calibrate the gloved hand touch threshold value of the gloved hand manipulation mode to the threshold values managing unit 16 on the basis of information of sets of proximity coordinates (x, y, z) and information of capacitance values that are output from the proximity coordinates extraction unit 13. The calibration instruction contains the capacitance values corresponding to the sets of proximity coordinates (x, y, z) that are output from the proximity coordinates extraction unit 13.

The threshold values managing unit 16 holds the bare hand touch threshold value $C_{touch}$ corresponding to the bare hand manipulation mode and the gloved hand touch threshold value $C_{th}$ corresponding to the gloved hand manipulation mode, and calibrates the gloved hand touch threshold value $C_{th}$ on the basis of a gloved hand touch threshold value calibration instruction (adjustment instruction) that is output from the state managing unit 15. The threshold values managing unit 16 outputs, to the state managing unit 15, the bare hand touch threshold value $C_{touch}$ corresponding to the bare hand manipulation mode, the gloved hand touch threshold value $C_{th}$ corresponding to the gloved hand manipulation mode, and a calibrated gloved hand touch threshold value. A method for calibrating the gloved hand touch threshold value will be described with reference to FIG. 4. Furthermore, the threshold values managing unit 16 holds an initial gloved hand touch threshold value $C_{th0}$ which is used when the portable terminal 1 is powered on or an unlocking picture for canceling a suspension state of the portable terminal 1 is displayed.

The coordinates notifying unit 17 outputs, to the downstream application 19, information of proximity coordinates (x, y, z) that is output from the proximity coordinates extraction unit 13 or information of touch coordinates (x, y) that is output from the touch coordinates extraction unit 14 if a capacitance value that is output from the proximity coordinates extraction unit 13 or the touch coordinates extraction unit 14 is larger than or equal to the gloved hand touch threshold value. While the operation mode of the portable terminal 1 is the gloved hand manipulation mode, the coordinates notifying unit 17 outputs, to the application 19, as touch coordinates, information of proximity coordinates (x, y, z) that is output from the proximity coordinates extraction unit 13.

The storage unit 18, which is formed by using a hard disk, a flash memory, or the RAM that is incorporated in the portable terminal 1, stores data acquired or generated by the portable terminal 1. The programs of the application 19 are stored in the storage unit 18. The storage unit 18 may be formed by using an external storage medium (e.g., USB memory) that is connected via a USB (universal serial bus) terminal, instead of a hard disk or a flash memory.

For example, the storage unit 18 stores data and image data of a picture to be used by the application 19, data generated by the application 19, image data received from a base station or another communication terminal (not shown), and pieces of arrangement coordinate information of picture components (e.g., buttons) of a picture of the application 19 and pieces of operation information of the application 19 assigned to the respective components.

Information of proximity coordinates (x, y, z) extracted by the proximity coordinates extraction unit 13 or information of touch coordinates (x, y) extracted by the touch coordinates extraction unit 14 may be stored temporarily in the storage unit 18. To avoid complicating the figure, arrows from the proximity coordinates extraction unit 13 and the touch coordinates extraction unit 14 to the storage unit 18 are not shown in FIG. 1.

The application 19 is stored in a ROM (read-only memory) that is incorporated in the portable terminal 1 and can be run by the processor that is incorporated in the portable terminal 1. The application 19 outputs, to the application picture generation unit 20, a screen-picture generation instruction to generate a screen-picture (application screen-picture) that conforms to a content of the application 19.

Based on the screen-picture generation instruction that is output from the application 19, the application picture generation unit 20 generates screen-picture data of an application screen-picture of the application 19 using data acquired from the storage unit 18 and displays the generated screen-picture data on the screen display unit 21.

The screen display unit 21 is formed by using an LCD or an organic EL display, for example, and has a function of displaying data on the display screen. The screen display unit 21 displays, on the screen 45, an application screen-picture (e.g., unlocking picture) generated by the application picture generation unit 20.

Next, problems of a touch manipulation and capacitance values relating to a gloved hand manipulation will be described with reference to FIG. 3. FIG. 3(A) illustrates problems of a touch manipulation performed in the gloved hand manipulation mode. FIG. 3(B) shows a capacitance waveform that is produced during a touch manipulation or a touch slide manipulation in the gloved hand manipulation mode. FIG. 3(C) illustrates an example gloved hand manipulation. FIG. 3(D) shows a capacitance waveform that is detected during the gloved hand manipulation shown in FIG. 3(C).

As shown in FIG. 3(A), in the case of the gloved hand manipulation, when a finger 65 that is covered with a glove 72 touches the surface of the touch panel 28, the touch panel 28 cannot generate as large a capacitance value as with a bare hand manipulation because the finger 65 does not come into direct contact with the touch panel 28 due to the thickness of the glove 72.

However, in the case of the gloved hand manipulation, as shown in FIG. 3(B), as long as the finger 65 that is covered with the glove 72 is kept in contact with the surface of the touch panel 28 as a result of a touch manipulation or a touch slide manipulation, the capacitance value (denoted by symbol a) obtained by the touch panel 28 is stable and varies only a little over time (refer to a range indicated by a dotted line m in FIG. 3(B)).

Therefore, as described later in detail, if capacitance values obtained by the touch panel 28 in a prescribed time in the bare hand manipulation mode, the portable terminal 1 switches the operation mode from the bare hand manipulation mode to the gloved hand manipulation mode.

Furthermore, the portable terminal 1 calibrates the gloved hand touch threshold value corresponding to the gloved hand manipulation mode on the basis of capacitance values obtained while a gesture (e.g., a gesture of forming a circle) is done as a gloved hand manipulation or a certain manipulation made on the surface of the touch panel 28 in the x and y directions (see FIGS. 3(C) and 3(D)). With this measure, the portable terminal 1 can adjust the gloved hand touch threshold value to a value that is suitable for the glove that is worn by the user on the basis of stable capacitance values obtained.

FIGS. 4(A)-4(C) illustrate methods for calibrating the gloved hand touch threshold value. FIG. 4(A) illustrates a method for calibrating the gloved hand touch threshold value $C_{th}$ on the basis of a capacitance value obtained while the height (z coordinate) is stable in a touch manipulation state. FIG. 4(B) illustrates a method for calibrating the gloved hand touch threshold value $C_{th}$ on the basis of an average of capacitance values obtained during a gloved hand manipulation. FIG. 4(C) illustrates a method for calibrating the gloved hand touch threshold value $C_{th}$ on the basis of a maximum value of capacitance values obtained during a gloved hand manipulation.

In FIG. 4(A), $C_{th0}$ represents an initial gloved hand touch threshold value which is held by the threshold values managing unit 16 in advance and $C_{th1}$ represents a gloved hand touch threshold value after calibration performed by the threshold values managing unit 16. The touch panel 28 detects a touch manipulation of a gloved hand manipulation when the value of a capacitance waveform a becomes larger than or equal to the initial gloved hand touch threshold value $C_{th0}$, and detects a release manipulation of the gloved hand manipulation when the value of the capacitance waveform a becomes smaller than the initial gloved hand touch threshold value $C_{th0}$.

Referring to FIG. 4(A), the threshold values managing unit 16 acquires, from the state managing unit 15, a capacitance value as a measurement value corresponding to a height (z coordinate value) of a finger 65 covered with a glove 72 that is making a touch manipulation in a state that the user wears the glove 72. The term "reference value" that will be used in the description to be made with reference to FIG. 4 means a capacitance value as a measurement value that the threshold values managing unit 16 acquires from the state managing unit 15.

The threshold values managing unit 16 calculates the ratio of the capacitance value of the current detection (e.g., detected at the present time) by the touch panel 28 to that of the preceding detection (e.g., detected 15 ms before the present time), and judges whether the calculated ratio is larger than or equal to a prescribed ratio. The prescribed ratio is a value for determining whether or not capacitance values obtained while a finger 65 covered with a glove 72 is making a touch manipulation (gloved hand manipulation) are stable. If judging that the calculated ratio is larger than or equal to the prescribed ratio, the threshold values managing unit 16 judges that the capacitance waveform a is not stable and updates the reference value to the capacitance value of the current detection.

On the other hand, if judging that the calculated ratio is smaller than the prescribed ratio, the threshold values managing unit 16 judges that the capacitance waveform a may be stable and maintain (i.e., does not update) the current reference value (capacitance value). Furthermore, the threshold values managing unit 16 performs the above-described ratio calculation and comparison with the prescribed ratio every time the touch panel 28 detects a capacitance value and judges whether or not the state that the reference value (capacitance value) is not updated has continued for a prescribed time.

If judging that the state that the reference value (capacitance value) is not updated has continued for the prescribed time, the threshold values managing unit 16 judges that the capacitance waveform a is stable and employs, as a calibrated gloved hand touch threshold value $C_{th1}$, a value obtained by subtracting a prescribed offset value d from a latest reference value (indicated by symbol b in FIG. 4(A)). With the calibration method of FIG. 4(A), the threshold values managing unit 16 can calibrate the gloved hand touch threshold value with high accuracy for gloved hand manipulations.

The prescribed offset value d is a fixed value that is determined through an actual measurement or a simulation that conforms to the calibration method of FIG. 4(A). After the calibration of FIG. 4(A), the touch panel 28 detects a touch manipulation of a gloved hand manipulation when the value of a capacitance waveform a has become larger than or equal to the initial gloved hand touch threshold value $C_{th1}$ and detects a release manipulation of the gloved hand manipulation when the value of the capacitance waveform a has become smaller than the initial gloved hand touch threshold value $C_{th1}$.

In FIG. 4(B), $C_{th2}$ represents a gloved hand touch threshold value before calibration by the threshold values managing unit 16 and $C_{th3}$ represents a gloved hand touch threshold value after the calibration by the threshold values managing unit 16. The value $C_{th2}$ may be equal to the initial gloved hand touch threshold value $C_{th0}$. The touch panel 28 detects a touch manipulation of a gloved hand manipulation when the value of a capacitance waveform a becomes larger than or equal to the initial gloved hand touch threshold value $C_{th2}$, and detects a release manipulation of the gloved hand manipulation when the value of the capacitance waveform a becomes smaller than the initial gloved hand touch threshold value $C_{th2}$.

Referring to FIG. 4(B), the threshold values managing unit 16 acquires, from the state managing unit 15, capacitance values corresponding to heights (z coordinate values) of a finger 65 covered with a glove 72 that is making a touch manipulation in a state that the user wears the glove 72. The threshold values managing unit 16 calculates an average (indicated by symbol v in FIG. 4(B)) of capacitance values obtained from detection of a touch manipulation by the touch panel 28 to detection of a release manipulation.

The threshold values managing unit 16 employs, as a calibrated gloved hand touch threshold value $C_{th3}$, a value obtained by subtracting a prescribed offset value e from the calculated average of the capacitance values. With the calibration method of FIG. 4(B), the threshold values managing unit 16 can calibrate the gloved hand touch threshold value with high accuracy for gloved hand manipulations.

The prescribed offset value e is a fixed value that is determined through an actual measurement or a simulation that conforms to the calibration method of FIG. 4(B). After the calibration of FIG. 4(B), the touch panel 28 detects a touch manipulation of a gloved hand manipulation when the value of a capacitance waveform a has become larger than or equal to the initial gloved hand touch threshold value $C_{th3}$ and detects a release manipulation of the gloved hand manipulation when the value of the capacitance waveform a has become smaller than the initial gloved hand touch threshold value $C_{th3}$.

In FIG. 4(C), as in FIG. 4(A), $C_{th0}$ represents an initial gloved hand touch threshold value which is held by the threshold values managing unit 16 in advance and $C_{th1}$ represents a gloved hand touch threshold value after calibration performed by the threshold values managing unit 16. The touch panel 28 detects a touch manipulation of a gloved hand manipulation when the value of a capacitance waveform a becomes larger than or equal to the initial gloved hand touch threshold value $C_{th0}$, and detects a release manipulation of the gloved hand manipulation when the value of the capacitance waveform a becomes smaller than the initial gloved hand touch threshold value $C_{th0}$.

Referring to FIG. 4(C), the threshold values managing unit 16 acquires, from the state managing unit 15, capacitance values corresponding to heights (z coordinate values) of a finger 65 covered with a glove 72 that is making a touch manipulation in a state that the user wears the glove 72. The threshold values managing unit 16 calculates a maximum value (see FIG. 4(C)) of the capacitance values that the touch panel 28 acquired from the detection of the touch manipulation to the detection of a release manipulation.

The threshold values managing unit 16 employs, as a calibrated gloved hand touch threshold value $C_{th1}$, a value obtained by subtracting a prescribed offset value f from the calculated maximum value of the capacitance values. With the calibration method of FIG. 4(C), the threshold values managing unit 16 can calibrate the gloved hand touch threshold value with high accuracy for gloved hand manipulations.

The prescribed offset value f is a fixed value that is determined through an actual measurement or a simulation that conforms to the calibration method of FIG. 4(C). After the calibration of FIG. 4(C), the touch panel 28 detects a touch manipulation of a gloved hand manipulation when the value of a capacitance waveform a has become larger than or equal to the initial gloved hand touch threshold value $C_{th1}$ and detects a release manipulation of the gloved hand manipulation when the value of the capacitance waveform a has become smaller than the initial gloved hand touch threshold value $C_{th1}$.

(Gloved Hand Manipulation Mode/Bare Hand Manipulation Mode Judgment by Initial Manipulation)

Figure 5:
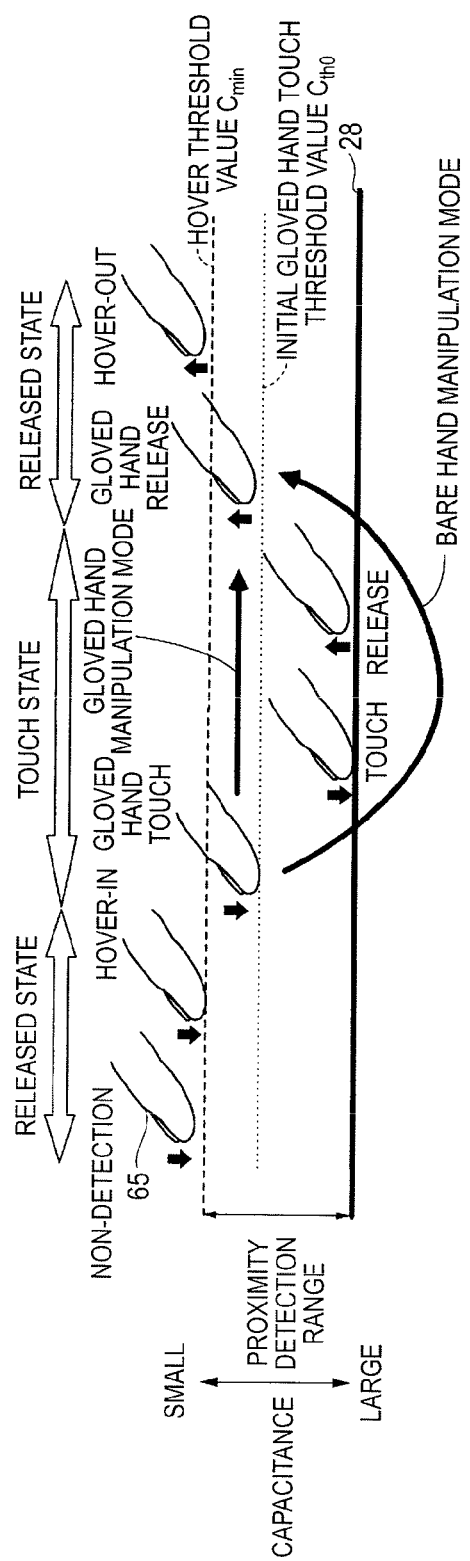
FIG. 5 illustrates a method for judging which of the gloved hand manipulation mode or the bare hand manipulation mode should be established, when an unlocking manipulation is performed.

FIG. 5 illustrates a method for judging which of the gloved hand manipulation mode and the bare hand manipulation mode should be established, when an unlocking manipulation is performed. The unlocking manipulation is an example initial manipulation of the portable terminal 1, that is, an example initial manipulation that is performed when the portable terminal 1 is powered on or the user starts using the portable terminal 1 from a state that it is suspended. As described later in detail, when an unlocking manipulation is performed, the operation mode of the portable terminal 1 is in a tentative gloved hand manipulation mode. Therefore, in FIG. 5, a gloved hand touch threshold value corresponding to the tentative gloved hand manipulation mode (e.g., initial value $C_{th0}$) is set.

The portable terminal 1 judges whether its operation mode should be set to the gloved hand manipulation mode or the bare hand manipulation mode on the basis of capacitance values or z coordinate values (heights) detected during an unlocking manipulation. More specifically, the touch panel 28 judges whether or not a finger 65 came into direct contact with the touch panel 28 from detection of a touch manipulation to detection of a release manipulation in the tentative gloved hand manipulation mode (see FIG. 5).

If judging that a finger 65 came into direct contact with the touch panel 28 from detection of a touch manipulation to detection of a release manipulation in the tentative gloved hand manipulation mode, then the state managing unit 15 judges that the operation mode of the portable terminal 1 should be set to the bare hand manipulation mode on the basis of information of touch coordinates (x, y) that is output from the touch coordinates extraction unit 14.

If judging that a finger 65 did not come into direct contact with the touch panel 28 from detection of a touch manipulation to detection of a release manipulation in the tentative gloved hand manipulation mode, then the state managing unit 15 judges that the operation mode of the portable terminal 1 should be set to the gloved hand manipulation mode on the basis of the information of sets of proximity coordinates (x, y, z) that is output from the proximity coordinates extraction unit 13.

Figure 6:
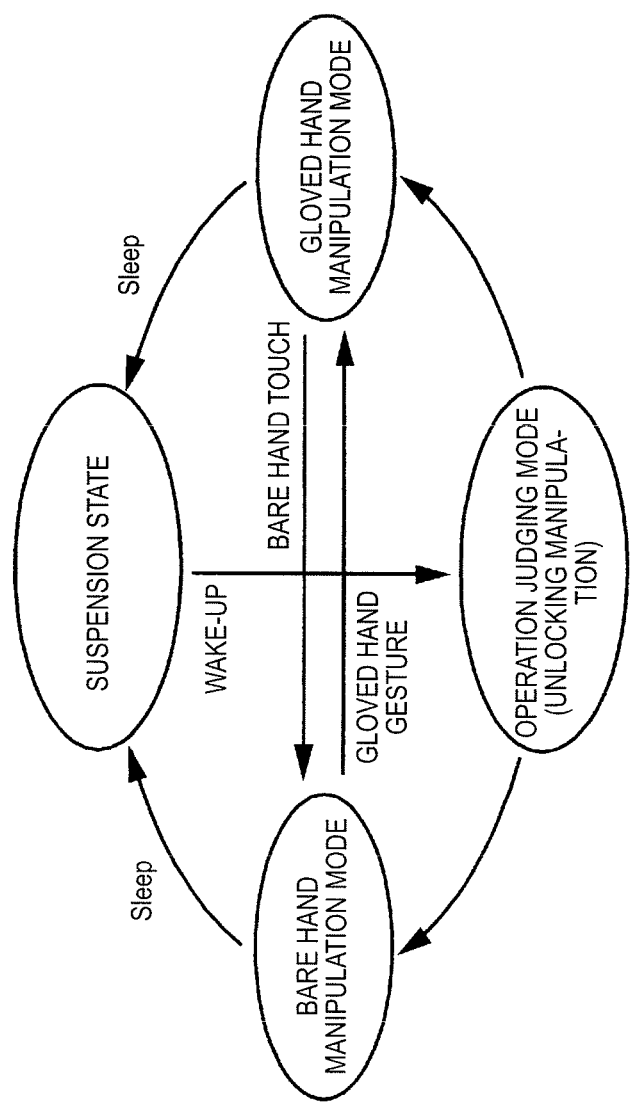
FIG. 6 is a state transition diagram of the operation mode of the portable terminal 1 in each embodiment.

FIG. 6 is a state transition diagram of the operation mode of the portable terminal 1 in each of the embodiments. As shown in FIG. 6, the states (operation modes) of the portable terminal 1 includes at least the suspension state in which the portable terminal 1 is in a standby state, the operation judging mode in which an initial manipulation (e.g., unlocking manipulation) is performed, the bare hand manipulation mode, and the gloved hand manipulation mode.

When the user makes a manipulation of canceling a suspension state of the portable terminal 1 (e.g., a manipulation of pushing a particular button) or the portable terminal 1 is powered on, the state managing unit 15 switches the operation mode of the portable terminal 1 from the suspension state to the operation judging mode. If the user makes an initial manipulation (e.g., unlocking manipulation) in the operation judging mode, the state managing unit 15 judges whether the operation mode of the portable terminal 1 should be set to the bare hand manipulation mode or the gloved hand manipulation mode. In the portable terminal 1, the unlocking manipulation may be a hover manipulation or a hover slide manipulation of a finger 65 or a touch manipulation or a touch slide manipulation of a finger 65.

As described later in detail in a second embodiment, if the user makes a direct touch manipulation on the touch panel 28 without wearing a glove 72 in the gloved hand manipulation mode, the state managing unit 15 switches the operation mode of the portable terminal 1 from the gloved hand manipulation mode to the bare hand manipulation mode.

As described later in detail in a third embodiment, if capacitance values that were obtained while the user made a certain manipulation wearing a glove 72 in the bare hand manipulation mode were stable, the state managing unit 15 switches the operation mode of the portable terminal 1 from the bare hand manipulation mode to the gloved hand manipulation mode.

If no manipulation has been made for, for example, a prescribed time in the bare hand manipulation mode or the gloved hand manipulation mode, the state managing unit 15 switches the operation mode of the portable terminal 1 from the bare hand manipulation mode or the gloved hand manipulation mode to the suspension state. Although not shown in FIG. 6, if no manipulation has been made for, for example, a prescribed time in the operation judging mode, the state managing unit 15 may switch the operation mode of the portable terminal 1 from the operation judging mode to the suspension state.

(Operation Procedure of Portable Terminal 1 According to Embodiment 1)

Figure 7:
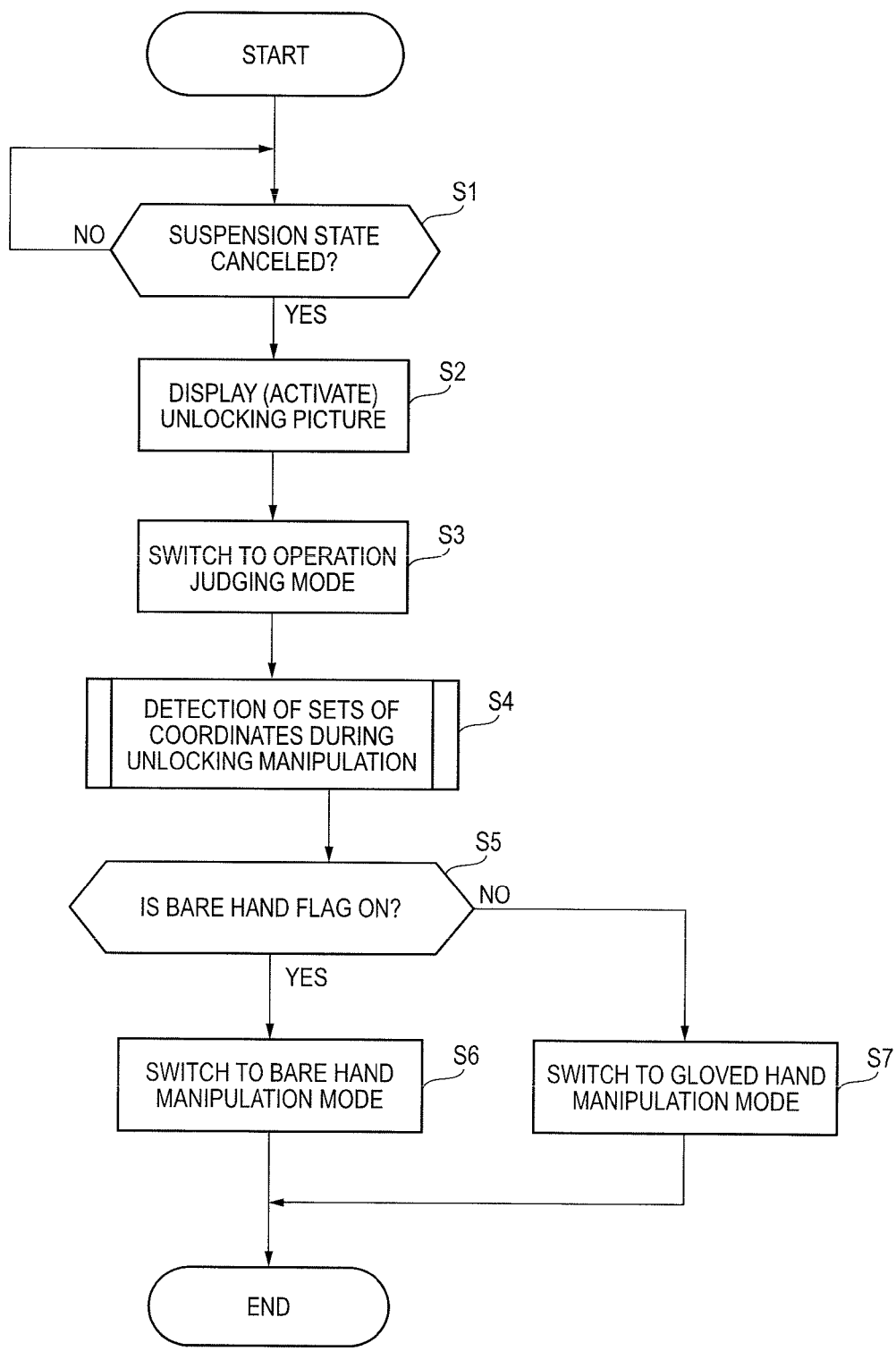
FIG. 7 is a flowchart showing an operation procedure of the portable terminal 1 according to the first embodiment.

FIG. 7 is a flowchart showing an operation procedure of the portable terminal 1 according to the first embodiment. Referring to FIG. 7, when a suspension state of the portable terminal 1 is canceled (S1: yes), in response to an instruction from the application 19, the application picture generation unit 20 displays (activates) an unlocking picture for a manipulation of unlocking the use of the portable terminal 1 (example initial manipulation) on the screen display unit 21 (S2). The application 19 outputs, to the state managing unit 15, an unlocking picture display notice to the effect that the unlocking picture has been displayed.

When receiving, from the application 19, the unlocking picture display notice to the effect that the unlocking picture has been displayed (activated), the state managing unit 15 switches the operation mode of the portable terminal 1 to the operation judging mode (S3) and outputs, to the threshold values managing unit 16, a switching notice to the effect that the operation mode of the portable terminal 1 has been switched to the operation judging mode. After the execution of step S3, in the portable terminal 1, an unlocking manipulation is performed and an operation mode of the portable terminal 1 is determined (S4). The details of step S4 will be described in detail with reference to FIG. 8.

The state managing unit 15 judges whether a bare hand flag as a processing result of step S4 is on (S5). The bare hand flag is a flag that is employed to indicate whether or not the operation mode of the portable terminal 1 should be set to the bare hand manipulation mode. For example, the operation mode of the portable terminal 1 should be set to the bare hand manipulation mode if the bare hand flag is "on" or "1," and to the gloved hand manipulation mode if the bare hand flag is "off" or "0." It is assumed that the bare hand flag is given an initial value (off) in the operation judging mode.

If judging that the bare hand flag is "on" (S5: yes), the state managing unit 15 switches the operation mode of the portable terminal 1 to the bare hand manipulation mode (S6). On the other hand, if judging that the bare hand flag is "off" (S5: no), the state managing unit 15 switches the operation mode of the portable terminal 1 to the gloved hand manipulation mode (S7). Then, the process of the portable terminal 1 is finished.

Figure 8:
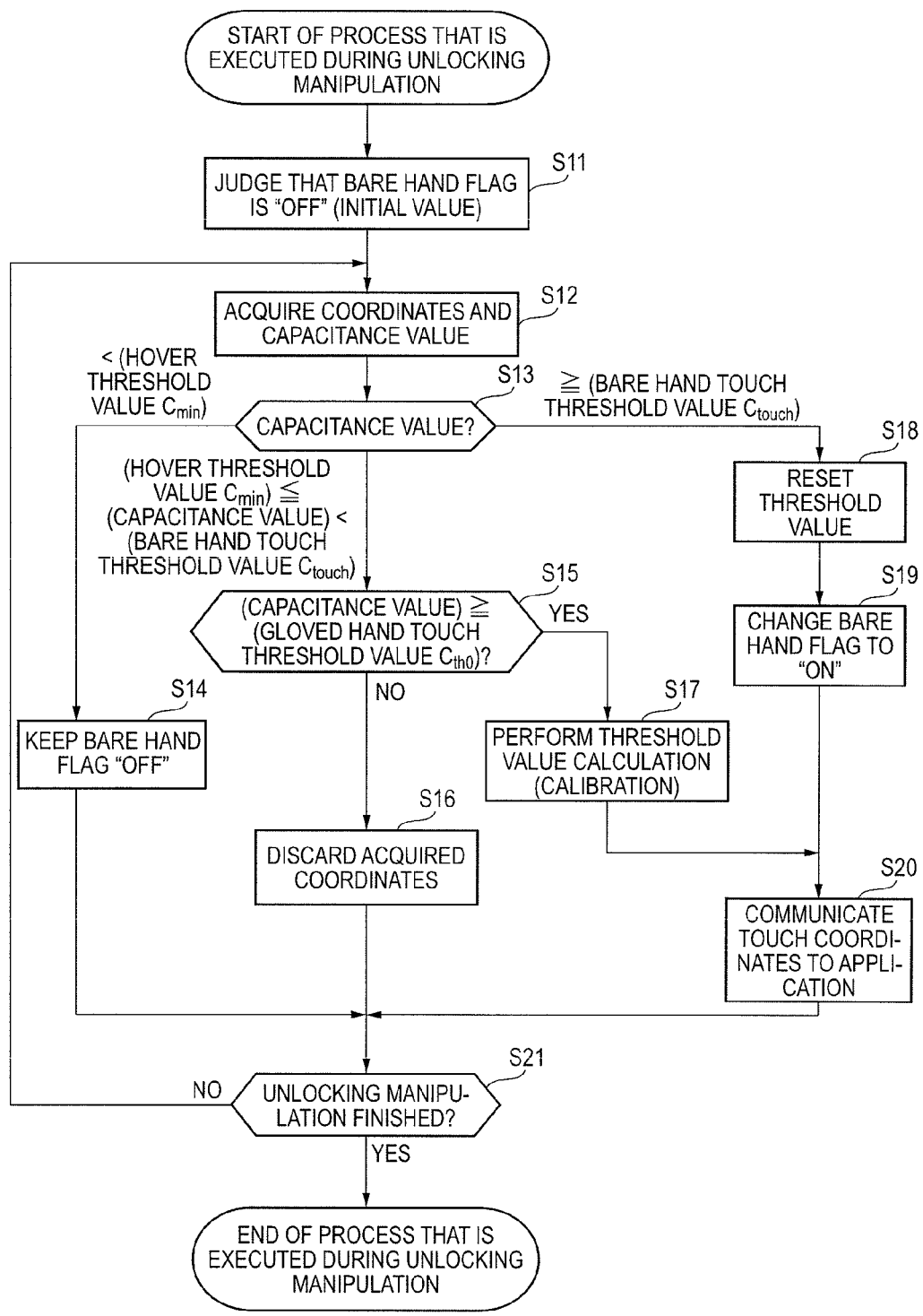
FIG. 8 is a flowchart showing an operation procedure that the portable terminal 1 follows during an unlocking manipulation at step S4.

FIG. 8 is a flowchart showing an operation procedure that the portable terminal 1 follows during an unlocking manipulation at step S4. The state managing unit 15 judges that the bare hand flag is "off" (initial value) (S11), and sets the gloved hand touch threshold value $C_{th0}$ for the tentative gloved hand manipulation mode which corresponds to the initial value of the bare hand flag. The state managing unit 15 acquires information of proximity coordinates (x, y, z) and information of a capacitance value corresponding to the proximity coordinates that are output from the proximity coordinates extraction unit 13 or information of touch coordinates (x, y) and information of a capacitance value corresponding to the touch coordinates that are output from the touch coordinates extraction unit 14 (S12).

The state managing unit 15 compares the capacitance value acquired at step S12 with the bare hand touch threshold value $C_{touch}$ and the hover threshold value $C_{min}$ (S13). If judging at step S13 that the capacitance value acquired at step S12 is smaller than the hover threshold value $C_{min}$, then the state managing unit 15 judges that the finger 65 has hovered out and hence the bare hand flag "off" that was decided on at step S11 should continue to be used (S14).

If judging at step S13 that the capacitance value acquired at step S12 is larger than or equal to the hover threshold value $C_{min}$ and smaller than the bare hand touch threshold value $C_{touch}$, then the state managing unit 15 judges whether the capacitance value acquired at step S12 is larger than or equal to the gloved hand touch threshold value $C_{th0}$ for the tentative gloved hand manipulation mode that was set at step S11 (S15).

If judging that the capacitance value acquired at step S12 is smaller than the gloved hand touch threshold value $C_{th0}$ (S15: no), then the state managing unit 15 judges that the finger 65 that is making a hover manipulation or a hover slide manipulation has not made a touch manipulation in the gloved hand manipulation mode and hence discards the proximity coordinates (x, y, z) acquired at step S12 without using them (S16).

On the other hand, if judging that the capacitance value acquired at step S12 is larger than or equal to the gloved hand touch threshold value $C_{th0}$ (S15: yes), then the state managing unit 15 judges that a touch manipulation has been made by a gloved hand manipulation rather than a bare hand manipulation and hence outputs a gloved hand touch threshold value calibration instruction to the threshold values managing unit 16. The threshold values managing unit 16 calibrates the gloved hand touch threshold value $C_{th0}$ that was set at step S11 on the basis of the calibration instruction that is output from the state managing unit 15 (S17). The method for calibrating the gloved hand touch threshold value $C_{th0}$ is not described here because it was described above with reference to FIG. 4. After the execution of step S17, the coordinates notifying unit 17 outputs (communicates), to the application 19, touch coordinates of a gloved hand manipulation, that is, proximity coordinates of a gloved hand manipulation corresponding to the bare hand flag "off" that was decided on at step S11 (S20).

If judging at step S13 that the capacitance value acquired at step S12 is larger than or equal to the bare hand touch threshold value $C_{touch}$, then the state managing unit 15 judges that a touch manipulation has been made by a bare hand rather than a gloved hand and hence outputs, to the threshold values managing unit 16, a reset instruction to initialize the gloved hand touch threshold value. The threshold values managing unit 16 initializes the current gloved hand touch threshold value to the bare hand touch threshold value $C_{touch}$ that was set at step S11 on the basis of the reset instruction that is output from the state managing unit 15 (S18). The state managing unit 15 judges that a bare hand manipulation has been made and hence the bare hand flag should be changed to "on" (S19).

After the execution of step S19, the coordinates notifying unit 17 acquires, from the state managing unit 15, touch coordinates of a bare hand manipulation, that is, information of touch coordinates of a bare hand manipulation corresponding to the bare hand flag "on" that was decided on at step S19, and outputs the acquired information to the application 19 (S20).

After the execution of step S14, S16, or S20, the state managing unit 15 judges whether or not the unlocking manipulation has finished (S21). If the unlocking manipulation has not finished yet (S21: no), the process of the portable terminal 1 returns to step S12. On the other hand, if the unlocking manipulation has finished (S21: yes), the process of FIG. 8 is finished and the process of the portable terminal 1 moves to step S5 shown in FIG. 7.

With the above process, when the user makes an unlocking manipulation as an example initial manipulation, the portable terminal 1 according to the first embodiment judges which of a bare hand manipulation and a gloved hand manipulation has been made. If judging that a gloved hand manipulation has been made, the portable terminal 1 calibrates the gloved hand touch threshold value. With this measure, in the portable terminal 1, after cancellation of a suspension state, the user need not bother to make a manipulation for calibrating the gloved hand touch threshold value in making a gloved hand manipulation. That is, the portable terminal 1 need not calibrate the gloved hand touch threshold value responsibly. The operability of a gloved hand manipulation can thus be increased. Furthermore, in the portable terminal 1, different gloved hand touch threshold values can be set that are suitable for individual gloves to be worn by the user that are different from each other in material, thickness, etc.

As such, the portable terminal 1 can correctly recognize whether a touch manipulation is going to be made in the form of a gloved hand manipulation or a bare hand manipulation and can adjust the gloved hand touch threshold value with high accuracy. That is, the portable terminal 1 can properly judge which of the gloved hand manipulation mode and the bare hand manipulation mode should be established on the basis of an input manipulation of the user on the touch panel 28, and switch the manipulation mode between the gloved hand manipulation mode and the bare hand manipulation mode in a simple manner.

Embodiment 2

A second embodiment is directed to a terminal apparatus 1 in which when its current operation mode is the gloved hand manipulation mode, switching is made from the gloved hand manipulation mode to the bare hand manipulation mode if a finger 65 comes into direct contact with the touch panel 28 during a certain gesture manipulation (not restricted to an initial manipulation). The configuration of the portable terminal according to the second embodiment is similar to that of the portable terminal according to the first embodiment. Therefore, constituent elements having the same ones in the first embodiment will be given the same symbols as the latter and descriptions therefor will be omitted. Only different constituent elements will be described below.

Figure 9:
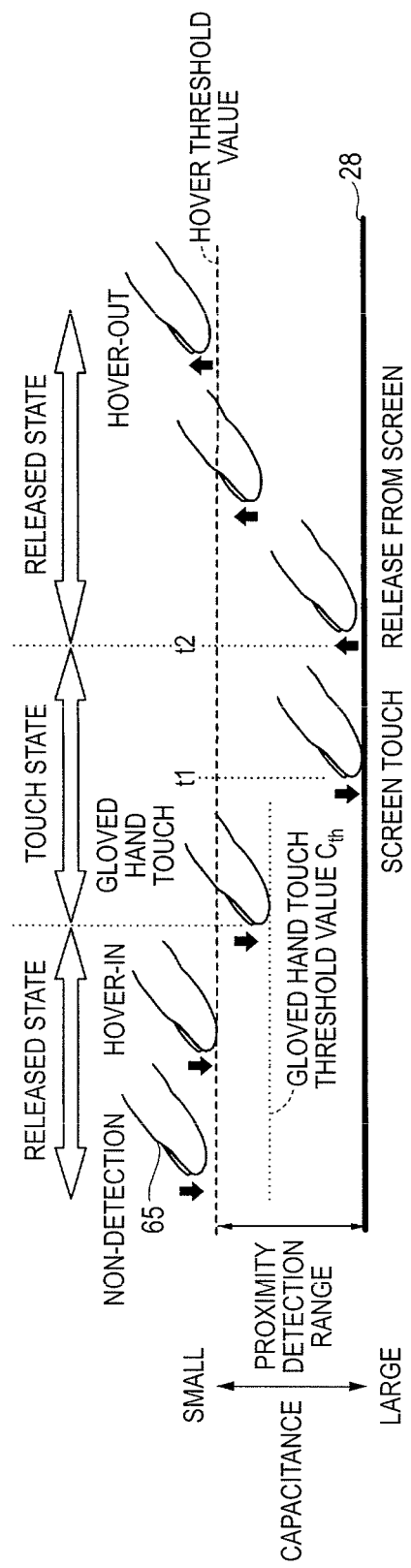
FIG. 9 illustrates a manipulation for switching from the gloved hand manipulation mode to the bare hand manipulation mode in the second embodiment.

FIG. 9 illustrates a manipulation for switching from the gloved hand manipulation mode to the bare hand manipulation mode in the second embodiment. If a capacitance value produced by a finger 65 that is covered with a glove 72 in the gloved hand manipulation mode is larger than or equal to the gloved hand touch threshold value $C_{th}$, a touch manipulation of a gloved hand manipulation is detected. If a capacitance value produced by a finger 65 that is not covered with a glove 72 in the gloved hand manipulation mode is larger than or equal to the bare hand touch threshold value $C_{touch}$, that is, if the finger 65 comes into direct contact with the touch panel 28, a touch manipulation of a bare hand manipulation is detected (time t1). At time t1, switching is made from the gloved hand manipulation mode to the bare hand manipulation mode. Furthermore, if the finger 65 is released from the touch panel 28 at time t2 after the transition to the bare hand manipulation mode, switching is made from the touch state to the released state.

(Operation Procedure of Terminal Apparatus 1 According to Embodiment 2)

Figure 10:
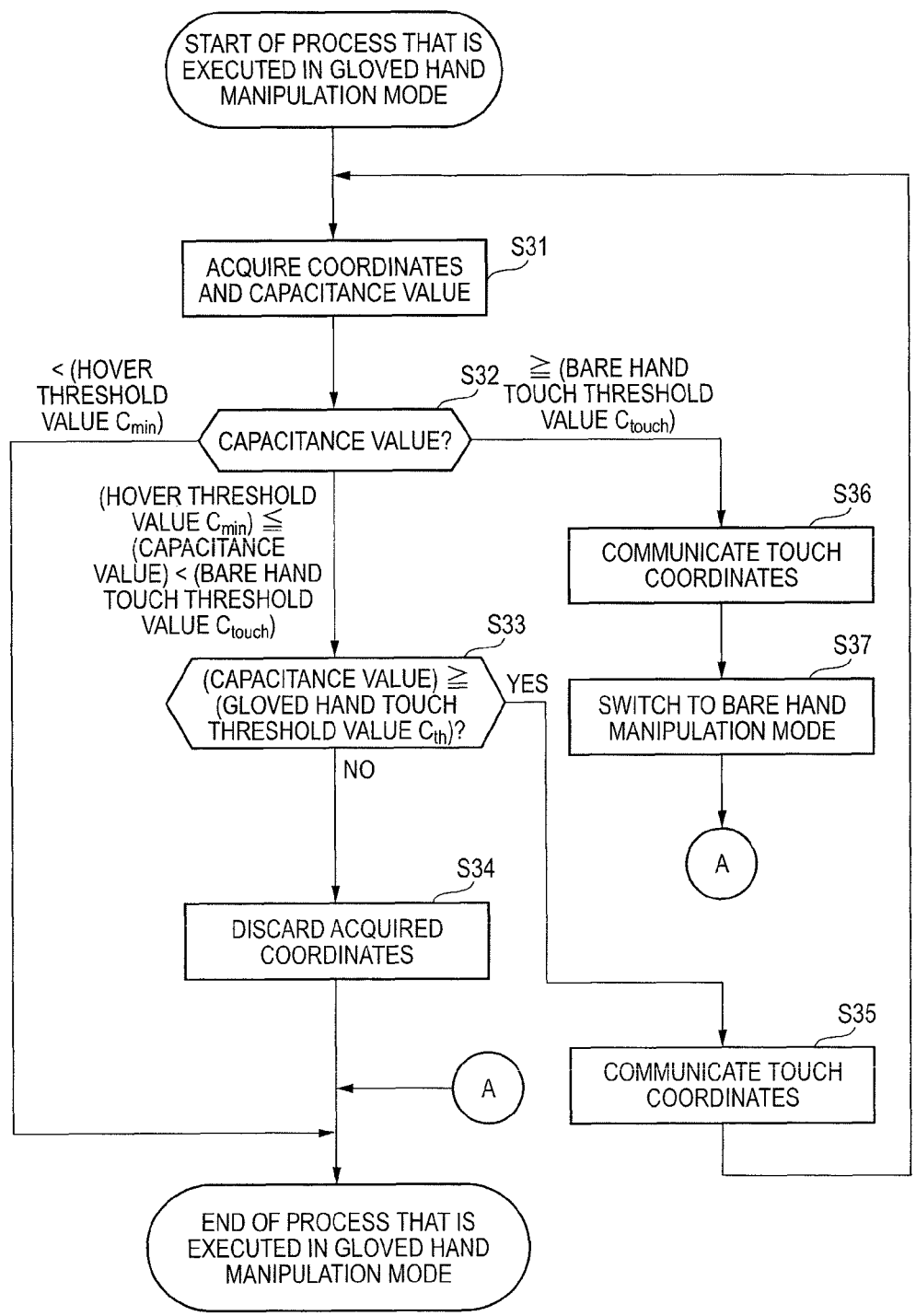
FIG. 10 is a flowchart showing an operation procedure in the gloved hand manipulation mode of a portable terminal 1 according to the second embodiment.

FIG. 10 is a flowchart showing an operation procedure in the gloved hand manipulation mode of the portable terminal 1 according to the second embodiment. The description to be made with reference to FIG. 10 assumes that since the operation mode of the portable terminal 1 is the gloved hand manipulation mode, the gloved hand touch threshold value $C_{th}$ for judging whether a touch manipulation of a gloved hand manipulation has been made or not is set.

The state managing unit 15 acquires information of proximity coordinates (x, y, z) and information of a capacitance value corresponding to the proximity coordinates that are output from the proximity coordinates extraction unit 13 or information of touch coordinates (x, y) and information of a capacitance value corresponding to the touch coordinates that are output from the touch coordinates extraction unit 14 (S31).

The state managing unit 15 compares the capacitance value acquired at step S31 with the bare hand touch threshold value $C_{touch}$ and the hover threshold value $C_{min}$ (S32). If judging at step S32 that the capacitance value acquired at step S31 is smaller than the hover threshold value $C_{min}$, then the state managing unit 15 judges that the finger 65 has hovered out and finishes the process of FIG. 10 being executed by the portable terminal 1 in the gloved hand manipulation mode.

If judging at step S32 that the capacitance value acquired at step S31 is larger than or equal to the hover threshold value $C_{min}$ and smaller than the bare hand touch threshold value $C_{touch}$, then the state managing unit 15 judges whether the capacitance value acquired at step S31 is larger than or equal to the gloved hand touch threshold value $C_{th}$ that is set currently (S33).

If judging that the capacitance value acquired at step S31 is smaller than the gloved hand touch threshold value $C_{th}$ (S33: no), then the state managing unit 15 judges that the finger 65 that is making a hover manipulation or a hover slide manipulation has not made a touch manipulation in the gloved hand manipulation mode and hence discards the proximity coordinates (x, y, z) acquired at step S31 without using them (S34).

On the other hand, if judging that the capacitance value acquired at step S31 is larger than or equal to the gloved hand touch threshold value $C_{th}$ (S33: yes), the coordinates notifying unit 17 acquires, from the state managing unit 15, information of touch coordinates of a gloved hand manipulation, that is, proximity coordinates (x, y, z) that are output from the proximity coordinates extraction unit 13, and outputs (communicates) the acquired information to the application 19 (S35).

If judging at step S32 that the capacitance value acquired at step S31 is larger than or equal to the bare hand touch threshold value $C_{touch}$, then the state managing unit 15 judges that a direct touch manipulation has been made on the touch panel 28 in the form of a bare hand manipulation rather than a gloved hand manipulation and outputs the information of the touch coordinates (x, y) acquired at step S31 to the coordinates notifying unit 17. The coordinates notifying unit 17 communicates the information of the touch coordinates (x, y) to the application 19 (S36). Furthermore, the state managing unit 15 causes switching from the gloved hand manipulation mode to the bare hand manipulation mode (S37). After the execution of step S37, the process being executed by the portable terminal 1 in the gloved hand manipulation mode is finished.

With the above process, the portable terminal 1 according to the second embodiment provides, in addition to the advantages of the portable terminal 1 according to the first embodiment, an advantage that switching from the gloved hand manipulation mode to the bare hand manipulation mode can be made immediately in a simple manner when a touch manipulation of a bare hand manipulation is made in the gloved hand manipulation mode, that is, a direct touch manipulation is made on the touch panel 28 by a finger 65 that is not covered with a glove 72 in the gloved hand manipulation mode. Therefore, in the portable terminal 1, the user need not bother to make a manipulation for switching to the bare hand manipulation mode on the portable terminal 1. That is, the user need not make an explicit operation mode switching manipulation. The user operability can thus be increased.

Embodiment 3

A third embodiment is directed to a terminal apparatus 1 in which when its current operation mode is the bare hand manipulation mode, switching is made from the bare hand manipulation mode to the gloved hand manipulation mode if capacitance values that were detected while the user made a certain gesture manipulation wearing a glove 72 were stable. The configuration of the portable terminal according to the third embodiment is similar to that of the portable terminal according to the first embodiment. Therefore, constituent elements having the same ones in the first embodiment will be given the same symbols as the latter and descriptions therefor will be omitted. Only different constituent elements will be described below.

As shown in FIG. 3(A), when it is attempted to make a gloved hand manipulation in the bare hand manipulation mode, a finger 65 covered with a glove 72 cannot directly touch the touch panel 28 because of the thickness of the glove 72. However, the position (height) of the finger 65 with respect to the touch panel 28 would be relatively stable because of the thickness of the glove 72. Therefore, capacitance values obtained for the finger 65 covered with the glove 72 would have a small variation and be close to a constant value (see FIG. 3(B)).

In this embodiment, if stable capacitance values have appeared for a prescribed time, the portable terminal 1 switches its operation mode from the bare hand manipulation mode to the gloved hand manipulation. Example gloved hand manipulations that cause detection of stable capacitance values are a gesture manipulation of forming a circle with respect to the touch panel 28 (see FIG. 3(C)) and a gesture manipulation of forming a straight line with respect to the touch panel 28. However, the gloved hand manipulation that causes detection of stable capacitance values is not limited to these example manipulations.

(Operation Procedure of Terminal Apparatus According to Embodiment 3)

Figure 11:
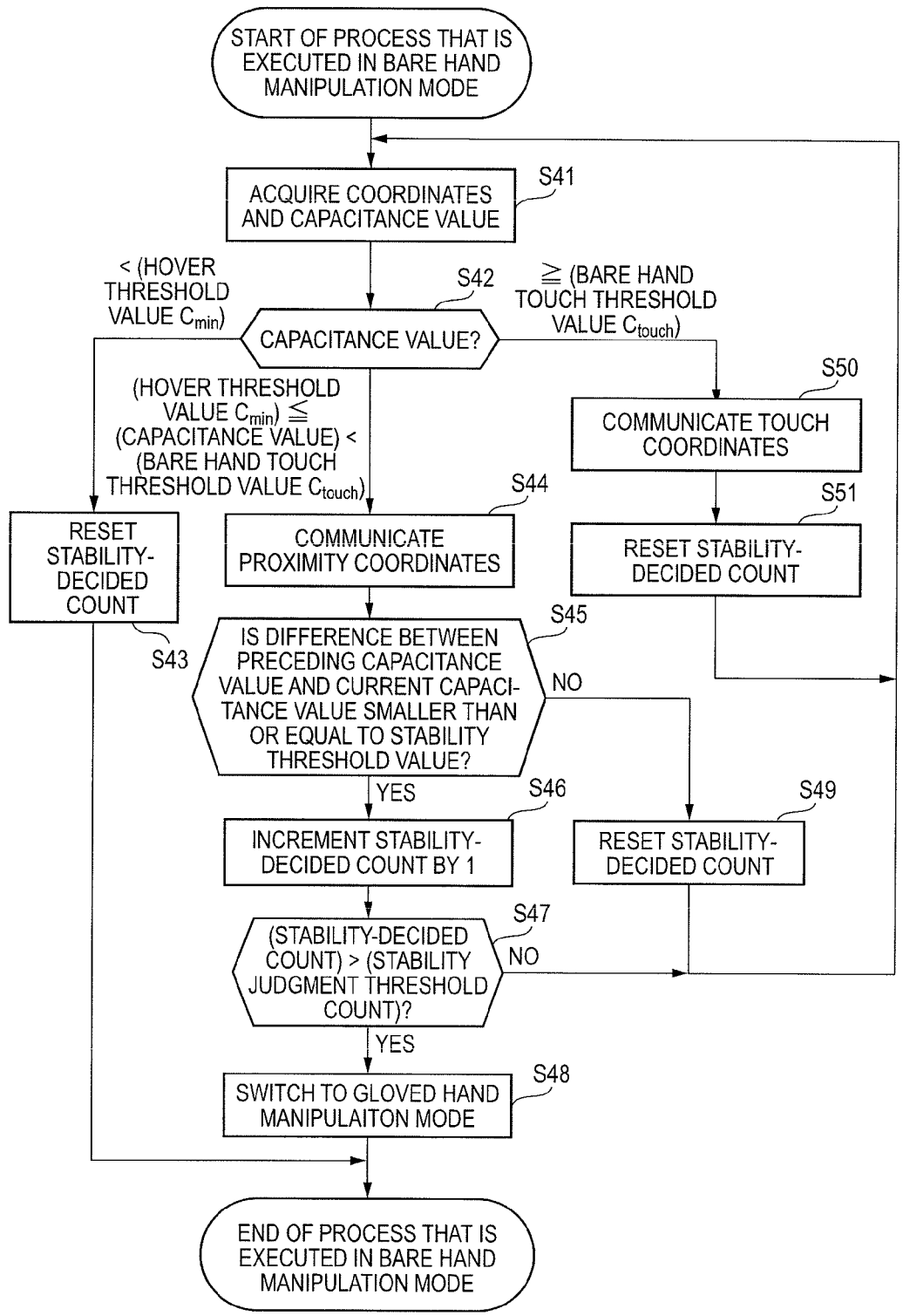
FIG. 11 is a flowchart showing an operation procedure in the bare hand manipulation mode of a portable terminal 1 according to a third embodiment.

FIG. 11 is a flowchart showing an operation procedure in the bare hand manipulation mode of the portable terminal 1 according to the third embodiment. The description to be made with reference to FIG. 11 assumes that since the operation mode of the portable terminal 1 is the bare hand manipulation mode, the bare hand touch threshold value $C_{touch}$ for judging whether a touch manipulation of a bare hand manipulation has been made or not is set.

The state managing unit 15 acquires information of proximity coordinates (x, y, z) and information of a capacitance value corresponding to the proximity coordinates that are output from the proximity coordinates extraction unit 13 or information of touch coordinates (x, y) and information of a capacitance value corresponding to the touch coordinates that are output from the touch coordinates extraction unit 14 (S41).

The state managing unit 15 compares the capacitance value acquired at step S41 with the bare hand touch threshold value $C_{touch}$ and the hover threshold value $C_{min}$ (S42). If judging at step S42 that the capacitance value acquired at step S41 is smaller than the hover threshold value $C_{min}$, then the state managing unit 15 judges that the finger 65 has hovered out and resets a stability-decided count for capacitance values (S43). Then the process of FIG. 11 being executed by the portable terminal 1 shown in FIG. 11 in the bare hand manipulation mode is finished.

The stability-decided count for capacitance values is a parameter for judging whether capacitance values obtained for a finger 65 in the bare hand manipulation mode is stable or not. In this embodiment, if the stability-decided count is larger than a prescribed stability judgment threshold count, the state managing unit 15 judges that the capacitance values obtained for the finger 65 in the bare hand manipulation mode is stable (see FIG. 3(B), for example).

If judging at step S42 that the capacitance value acquired at step S41 is larger than or equal to the hover threshold value $C_{min}$ and smaller than the bare hand touch threshold value $C_{touch}$, the state managing unit 15 outputs the information of the proximity coordinates (x, y, z) acquired at step S41 to the coordinates notifying unit 17. The coordinates notifying unit 17 communicates the information of the proximity coordinates (x, y, z) to the application 19 (S44).

After the execution of step S44, the state managing unit 15 judges whether the difference between the capacitance value corresponding to the proximity coordinates acquired at the time of the preceding detection (e.g., 15 ms before the present time) and the capacitance value corresponding to the proximity coordinates acquired by the detection of this time (e.g., present time) is smaller than or equal to a prescribed stability threshold value (S45). The prescribed stability threshold value is a prescribed value that is employed to judge whether capacitance values are stable or not on the basis of the ratio between capacitance values obtained by the preceding detection and the detection of this time, and is set in a range of 0.95 to 1.05, for example.

If judging that the difference between the capacitance value corresponding to the proximity coordinates acquired at the time of the preceding detection (e.g., 15 ms before the present time) and the capacitance value corresponding to the proximity coordinates acquired by the detection of this time (e.g., present time) is smaller than or equal to the prescribed stability threshold value (S45: yes), the state managing unit 15 increments the stability-decided count by 1 (S46). Furthermore, the state managing unit 15 judges whether or not the stability-decided count is larger than the prescribed stability judgment threshold count (S47).

If judging that the stability-decided count is larger than the prescribed stability judgment threshold count (S47: yes), then the state managing unit 15 judges that a bare hand manipulation has been made because stable capacitance values have been obtained for longer than or equal to a period corresponding to the stability judgment threshold count in the bare hand manipulation mode. And the state managing unit 15 switches the operation mode of the portable terminal 1 from the bare hand manipulation mode to the gloved hand manipulation (S48). After the execution of step S48, the process of FIG. 11 being executed by the portable terminal 1 in the bare hand manipulation mode is finished.

On the other hand, if judging that the difference between the capacitance value corresponding to the proximity coordi-nates acquired at the time of the preceding detection (e.g., 15 ms before the present time) and the capacitance value corresponding to the proximity coordinates acquired by the detection of this time (e.g., present time) is larger than the prescribed stability threshold value (S45: yes), the state managing unit 15 resets the stability-decided count (S49).

After the execution of step S49 or the judgment to the effect that the stability-decided count is not larger than the prescribed stability judgment threshold count (S47: no), the process of the portable terminal 1 returns to step S41.

If judging at step S42 that the capacitance value acquired at step S41 is larger than or equal to the bare hand touch threshold value $C_{touch}$, then the state managing unit 15 judges that a direct touch manipulation has been made on the touch panel 28 in the form of a bare hand manipulation rather than a gloved hand manipulation and outputs the information of the touch coordinates (x, y) acquired at step S41 to the coordinates notifying unit 17. The coordinates notifying unit 17 communicates the information of the touch coordinates (x, y) to the application 19 (S50). Furthermore, the state managing unit 15 resets the stability-decided count (S51). After the execution of step S51, the process of the portable terminal 1 in the gloved hand returns to step S41.

With the above process, the portable terminal 1 according to the third embodiment provides, in addition to the advantages of the portable terminal 1 according to the first or second embodiment, an advantage that switching from the bare hand manipulation mode to the gloved hand manipulation mode can be made in a simple manner when a gloved hand manipulation is made in the bare hand manipulation mode. Therefore, in the portable terminal 1, the user need not bother to make a manipulation for switching to the gloved hand manipulation mode on the portable terminal 1. That is, the user need not make an explicit operation mode switching manipulation. The user operability can thus be increased.

Although the various embodiments have been described above with reference to the drawings, it goes without saying that the invention is not limited to those examples. It is apparent that those skilled in the art would conceive changes or modifications of the various embodiments or combinations of the various embodiments within the confines of the scope of the claims. And such changes, modifications, or combinations should naturally be included in the technical scope of the invention.

In the above-described embodiments, the portable terminal 1 may further be equipped with an output unit (or outputter) for explicitly announcing a current operation mode to the user. Example methods by which the output unit announces a current operation mode are display of a popup picture or the like on the screen display unit 21, audio announcement, announcement using vibration patterns, and announcement using flashing patterns. With this measure, the portable terminal 1 explicitly allows the user to recognize a current operation mode and allows the user to grasp a current operation mode easily.

Although the above-described first embodiment is directed to the case the gloved hand touch threshold value is calibrated by an initial manipulation that is made in a state that an unlocking picture is displayed, the gloved hand touch threshold value may be calibrated, for example, immediately after switching from the bare hand manipulation mode to the gloved hand manipulation. In this case, the portable terminal 1 can adjust the gloved hand touch threshold value properly.

The present application is based on Japanese Patent Application No. 2012-129228 filed on Jun. 6, 2012, the contents of which are incorporated herein by reference.

INDUSTRIAL APPLICABILITY

The invention is useful when applied to input device, input support methods, and programs which properly judge which of the gloved hand manipulation and the bare hand manipulation mode should be established in accordance with an input manipulation on the touch panel, and which switch to the bare hand manipulation mode or the gloved hand manipulation in a simple manner.

DESCRIPTION OF REFERENCE NUMERALS AND SIGNS

1: Portable terminal
5: Control unit
11: Proximity detection unit
12: Touch detection unit
13: Proximity coordinates extraction unit
14: Touch coordinates extraction unit
15: State managing unit
16: Threshold values managing unit
17: Coordinates notifying unit
18: Storage unit
19: Application
20: Application picture generation unit
21: Screen display unit

The invention claimed is:

1. An input apparatus comprising:
   a touch panel;
   an extractor that extracts a distance between a surface of the touch panel and an indication medium;
   a state manager that sets an operation mode of the input apparatus to a bare hand manipulation mode when the extracted distance is smaller than a first distance during a calibration, and to a gloved manipulation mode when the extracted distance remains between the first distance and a second distance for a predetermined time period during the calibration, the second distance being larger than the first distance; and
   a controller that determines that the indication medium is touching the touch panel when the distance detected after the calibration is smaller than a threshold distance, the threshold distance being larger in the gloved manipulation mode than in the bare hand manipulation mode.

2. The input apparatus according to claim 1, wherein the threshold distance is set by applying a prescribed offset value to the distance extracted during the calibration.

3. The input apparatus according to claim 1, wherein, the state manager further switches the operation mode from the gloved manipulation mode to the bare hand manipulation mode, when the extracted distance becomes smaller than the first distance while the input apparatus is operating in the gloved manipulation mode after the calibration.

4. The input apparatus according to claim 1, wherein the state manager further switches the operation mode from the bare hand manipulation mode to the gloved manipulation mode when the extracted distance remains between the first distance and the second distance for a predetermined time period while the input apparatus is operating in the bare hand manipulation mode after the calibration.

5. The input apparatus according to claim 1, further comprising:
   an outputter that indicates the operation mode by at least one of displaying a notification on a display, producing an audio announcement, changing vibration patterns and changing flashing patterns.

6. An input assisting method of an input apparatus having a touch panel, comprising:
   extracting a distance between a surface of the touch panel and an indication medium;
   setting an operation mode of the input apparatus to a bare hand manipulation mode when the extracted distance is smaller than a first distance during a calibration;
   setting the operation mode of the input apparatus to a gloved manipulation mode when the extracted distance remains between the first distance and a second distance for a predetermined time period during the calibration, the second distance being larger than the first distance; and
   determining that the indication medium is touching the touch panel when the distance extracted after the calibration is smaller than a threshold distance, the threshold distance being larger in the gloved manipulation mode than in the bare hand manipulation mode.

7. The input apparatus according to claim 1, wherein,
   the calibration is performed while an unlocking manipulation is performed by the indication medium, the input apparatus being unlocked from a locked state by the unlocking manipulation, and
   the state manager sets the operation mode to the bare hand manipulation mode, when the distance extracted while the unlocking manipulation is performed is smaller than the first distance.

8. The input apparatus according to claim 1 wherein,
   the calibration is performed while an unlocking manipulation is performed by the indication medium, the input apparatus being unlocked from a locked state by the unlocking manipulation, and
   the state manager sets the operation mode to the gloved manipulation mode, when the distance extracted while the unlocking manipulation is performed remains between the first distance and the second distance for the predetermined time period.

* * * * *